(12) United States Patent
Bennett

(10) Patent No.: US 7,401,451 B2
(45) Date of Patent: Jul. 22, 2008

(54) CONDITIONING OF ARTICLES

(75) Inventor: Robert Bennett, West Midlands (GB)

(73) Assignee: Ishida Co., Ltd., Kyoto (JP)

( * ) Notice: Subject to any disclaimer, the term of this patent is extended or adjusted under 35 U.S.C. 154(b) by 147 days.

(21) Appl. No.: 10/187,427

(22) Filed: Jul. 2, 2002

(65) Prior Publication Data
US 2003/0015402 A1    Jan. 23, 2003

(30) Foreign Application Priority Data
Jul. 9, 2001   (GB) .................................. 0116746.8

(51) Int. Cl.
*B65B 1/24* (2006.01)
(52) U.S. Cl. .............................. 53/436; 53/526; 73/45.4; 73/45; 73/41.3
(58) Field of Classification Search .................... 53/436, 53/526, 437, 525; 100/152, 154; 73/45.4, 73/45, 41.3, 52; 83/422, 436.45; 198/459.8, 198/626.5, 589, 861.3
See application file for complete search history.

(56) References Cited

U.S. PATENT DOCUMENTS

| 3,977,483 | A | * | 8/1976 | Greanias ........................ 177/1 |
| 4,443,955 | A | | 4/1984 | Beckmann |
| 5,251,422 | A | * | 10/1993 | Goodman et al. ............. 53/251 |
| 5,284,003 | A | * | 2/1994 | Goodman et al. ............. 53/437 |
| 5,786,530 | A | * | 7/1998 | Fenlon ........................ 73/49.3 |
| 6,094,888 | A | * | 8/2000 | Pazdernik et al. ............. 53/436 |
| 6,105,419 | A | * | 8/2000 | Michels et al. ................ 73/49.3 |
| 6,129,200 | A | | 10/2000 | Graham |
| 6,360,870 | B1 | * | 3/2002 | Wooldridge ................ 198/391 |

FOREIGN PATENT DOCUMENTS

| EP | 0 556 497 A1 | 8/1993 |
| GB | 2 316 926 A | 3/1998 |

OTHER PUBLICATIONS

Patent Abstracts of Japan, vol. 2002, No. 02, JP 2001-270611, Feb. 10, 2001 (English language Abstract).
Patent Abstracts of Japan, vol. 2002, No. 02, JP 2001-269598, Feb. 10, 2001 (English language Abstract).
Patent Abstracts of Japan, vol. 1995, No. 11, JP 07-196119, Jan. 8, 1995 (English language Abstract).

* cited by examiner

*Primary Examiner*—Hemant M. Desai
(74) *Attorney, Agent, or Firm*—Staas & Halsey LLP

(57) ABSTRACT

A method and apparatus for the conditioning of articles. According to one aspect of the invention, a conveyor conveys articles in a conveying direction along a path. A rotatable belt assembly extends adjacent to the path. The rotatable belt assembly includes a belt having a conditioning run extending generally in the conveying direction to contact articles being conveyed along the path. The belt is mounted so that it is capable of displacement to vary the spacing of the conditioning run from the conveying path. The rotatable belt assembly moves vertically and/or with a rocking movement to condition the articles contacted by the conditioning run. The speed of rotation of the rotatable belt assembly may be varied to adjust the spacing between the articles being conveyed.

25 Claims, 3 Drawing Sheets

CONDITIONING OF ARTICLES

CROSS-REFERENCE TO RELATED APPLICATION

This application is based on, and claims priority to, UK Patent Application No. 0116746.9 filed on Jul. 9, 2001, titled "Conditioning of Packages," the contents of which are hereby incorporated by reference.

BACKGROUND OF THE INVENTION

Field of the Invention

The present invention relates to a method and apparatus for the conditioning of articles. In particular, the present invention relates to a method and apparatus for the conditioning of articles that are, for example, air tight bags of loose items, especially fragile items such as potato chips and other snack foods.

SUMMARY OF THE INVENTION

In one aspect of the invention, a conveyor conveys articles in a conveying direction along a path. A rotatable belt assembly extends adjacent to the path. The rotatable belt assembly includes a belt having a conditioning run extending generally in the conveying direction to contact articles being conveyed along the path. The belt is mounted so that it is capable of displacement to vary the distance of the conditioning run from the conveying path.

Conditioning of articles refers to changing the condition or state of an article. For example, if the article is a bag of potato chips, the bag may be "plumped" to restore the bag to a predetermined conformation.

Preferably, the conveyor is a vibratory conveyer, especially a bowl feeder. The belt is preferably mounted so that the conditioning run is capable of generally vertical linear displacement towards and away from the path, and/or an arcuate, rocking displacement.

The belt preferably presents a gentle, yielding surface to articles by being readily displaceable and/or intrinsically soft and yielding. Thus, the belt may extend over two spaced pulleys. Also, the belt material may be yielding, for example, by having a coating of a resilient foam material.

The speed of rotation of the belt and/or the conveying speed are preferably variable.

Another aspect of the invention provides a method of conditioning articles, particularly air tight articles, comprising conveying the articles along a path and contacting the articles with a conditioning run of a rotatable belt assembly, as described above. As well as conditioning the articles, the rotatable belt assembly can be used to adjust the spacing of downstream articles by adjusting the rate of rotation of the rotatable belt assembly.

A further aspect of the present invention provides an apparatus for conditioning articles that includes a bowl feeder with a bowl and a spiral track conveyer extending from a bottom to a top of the bowl feeder. The bowl feeder is vibrated to cause articles in the bowl to travel up the spiral track and exit along an outlet path. The articles traveling along the spiral track conveyer contact a radially outer wall of the bowl feeder to orient the articles. A rotatable belt assembly above the outlet path has a belt with a conditioning run that moves in the same direction as the articles being conveyed and extends in the conveying direction. The rotatable belt assembly moves vertically and/or with a rocking movement to contact and thereby condition the articles as the articles exit along the outlet path.

An additional aspect of the present invention provides an apparatus including (a) a conveyor moving air tight bags in a conveying direction along a path; and (b) a conditioning run extending in the conveying direction and contacting the bags being conveyed to plump the bags.

These, together with other aspects and advantages that will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
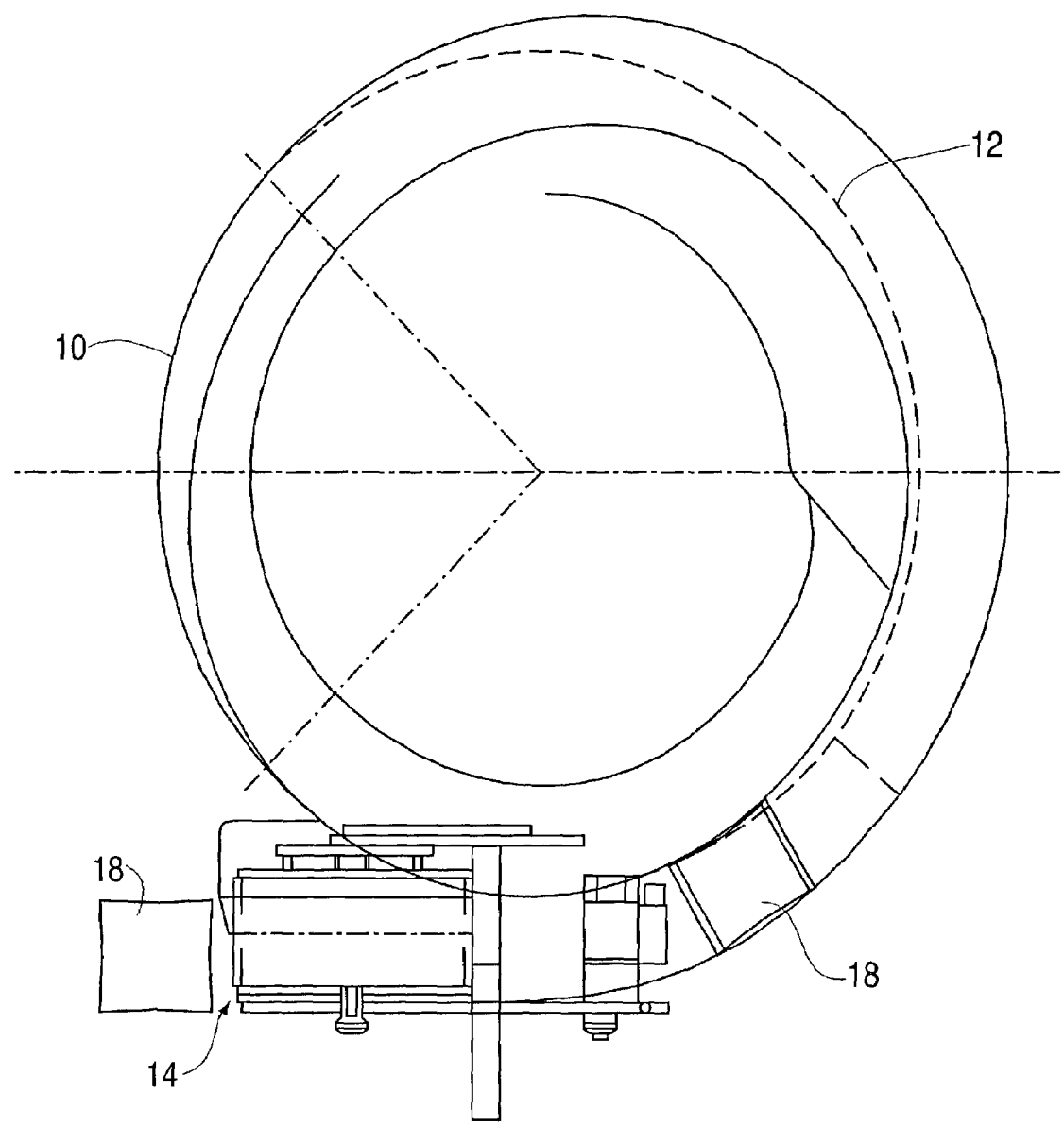
FIG. 1 is a plan view of a conveyor having a bowl feeder and a rotatable belt assembly according to an embodiment of invention.
Figure 2:
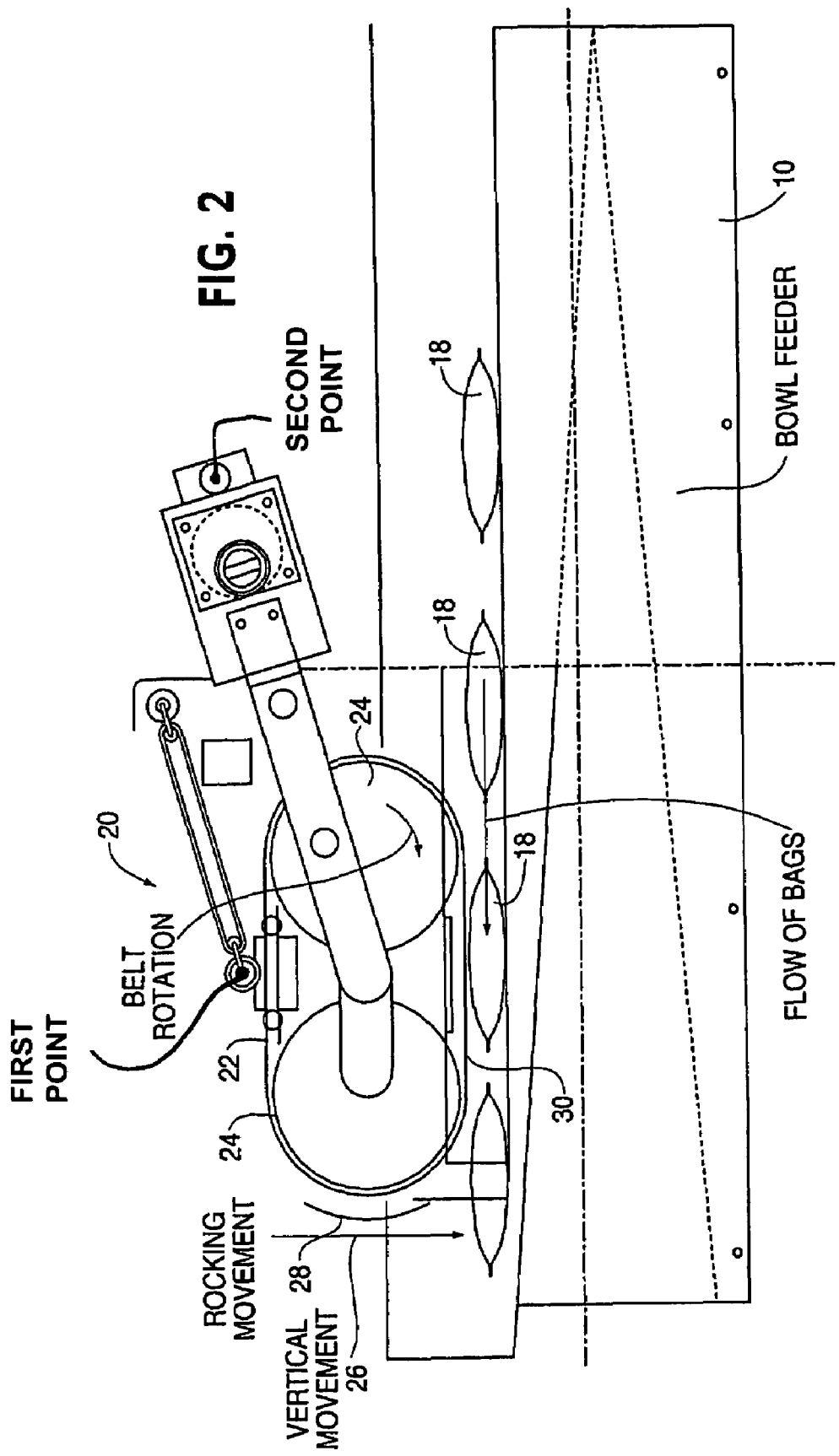
FIG. 2 is a side elevational view, on a larger scale, of the rotatable belt assembly and a part of the bowl feeder shown in FIG. 1.
Figure 3:
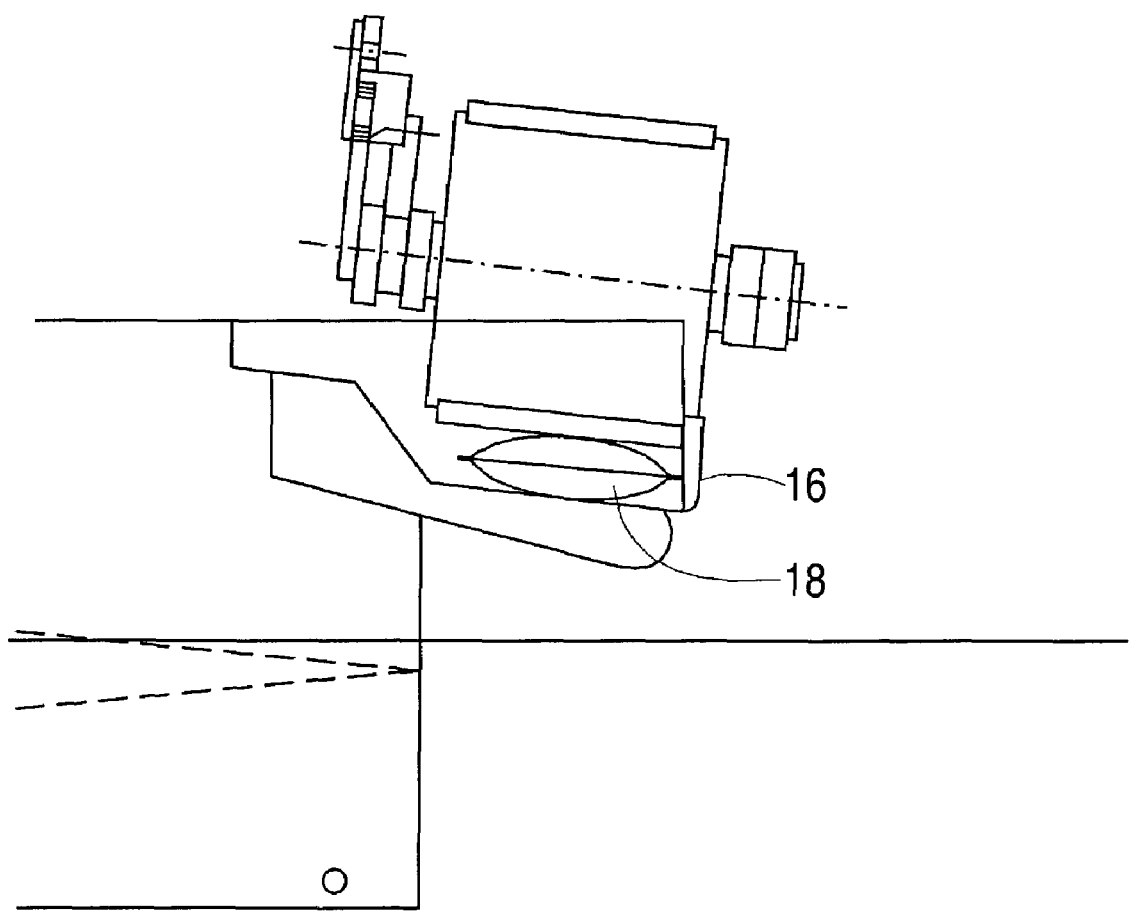
FIG. 3 is a front elevational view of the rotatable belt assembly of FIG. 2.

FIG. 1 shows a bowl feeder 10 with, for example, a spiral track conveyor 12 that leads upwards from a lower region to a generally straight outlet path 14 at the top of the bowl feeder 10. The bowl feeder 10 is displaceable and connected to a motor unit so that the bowl feeder 10 can be vibrated vigorously to cause articles 18 in the bowl feeder 10 to travel up the spiral track conveyor 12 and exit along the outlet path 14. Referring to FIGS. 2 and 3, the outlet path 14 has, for example, a lateral slope in the radially outward direction of the bowl feeder 10 so that an article 18 traveling along the spiral track conveyor 12 tends to contact a radially outer wall 16 of the bowl feeder 10. This standardizes the position of the articles 18, reduces the risk of the articles 18 falling from the spiral track conveyor 12, and also tends to orient the articles 18.

The articles 18 shown in FIGS. 1-3 are, for example, packets of snack foods, such as potato chips. The packets containing the snack foods are, for example, air tight bags of a thin film material.

The outlet path 14 passes under a rotatable belt assembly 20. The rotatable belt assembly 20 has, for example, a foam covered belt 22, which passes over, for example, two large diameter pulleys 24 that are driven by a speed-controlled motor. The rotatable belt assembly 20 is carried by, for example, a support frame that permits adjustment of height above the outlet path 14, and that also allows the rotatable belt assembly 20 to move vertically as shown by arrow 26 and/or with a rocking movement as shown by arrow 28.

A lower conditioning run 30 of the belt 22 is spaced from the outlet path 14 by a distance approximately the same as the intended thickness of an article 18. Because the outlet path 14 is an extension of the spiral track conveyor 12 of the bowl feeder 10, the outlet path 14 vibrates in use so that the gap between the outlet path 14 and the conditioning run 30 varies. Thus, articles 18 passing through the gap may contact the belt 22. The contact is quite gentle, partly because of the nature of the foam covered belt 22, and partly because the mounting of the rotatable belt assembly 20 allows the belt 22 to move away if it is pushed hard by an article 18.

The belt 22 is rotated so that the conditioning run 30 travels in the same direction as the articles 18 being conveyed. The gentle contact, assisted by the vertical and/or rocking movement of the belt unit, gently presses an article. Specifically, rocking is achieved by movement about a first point, and vertical movement is achieved by movement about a second point. For an air light gas-filled bag, this tends to "plump" the bag, restoring it to its optimum conformation.

The speed of the belt 22 may be controlled so that it is either the same as, or different from, the speed at which the articles 18 leave the belt 22 conveyor.

Also, the speed of the belt 22 may be varied to change the spacing of the articles 18. For example, a higher belt speed can be used to increase the spacing of the articles 18 on the conveyor downstream of the rotatable belt assembly 20. This can be useful to give downstream machines more time for handling the articles 18.

The conveyor is not limited to any particular size, shape, or type of conveyor. Also, the articles are not limited to any particular size, shape, weight, or type of articles. Moreover, while the articles have been described as being air tight, the present invention is not limited to articles that are air tight. In addition, the belt assembly is not limited to any particular number or configuration of pulleys, type of belts, or structure. Instead, various modifications can be made to the conveyor, articles, and belt assembly to achieve the intended operation of the present invention.

A belt assembly is described herein as being "rotatable." However, the present invention is not limited to a belt assembly which is "rotatable". Instead, the belt assembly should simply have sufficient functionality to perform the intended operation. Further, the present invention is not limited to the use of a "belt assembly". Instead, other types of mechanisms may be usable to achieve the intended operation.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An apparatus for conditioning articles, comprising:
    a conveyor moving articles in a conveying direction along a path; and
    a belt assembly adjacent to the path, the belt assembly having a belt with a conditioning run extending in the conveying direction and contacting the articles being conveyed to condition the articles, the entire belt assembly rocking about a first point in response to the contact with the articles, a speed of rotation of the belt being variable to adjust a spacing between the articles being conveyed,
    the belt assembly further moving vertically by the articles, independent of the rocking by moving the conditioning run about a second point, further from the conditioning run than the first point, to reshape the article to an optimal configuration.

2. The apparatus of claim 1, wherein the conditioning run travels in a same direction as the articles being conveyed.

3. The apparatus of claim 1, wherein the conveyor is a bowl feeder.

4. The apparatus of claim 1, wherein the belt extends over pulleys with the belt being displaceable and moving away from any articles that push against the belt.

5. The apparatus of claim 1, wherein the belt is coated with a resilient foam material.

6. The apparatus of claim 1, wherein the belt assembly is rotatable, and a speed of the conveyor, and a distance of the conditioning run above the path are variable.

7. A method of conditioning articles, comprising:
    moving articles in a conveying direction along a path;
    contacting the moving articles with a conditioning run to condition the articles as the articles are being conveyed;
    rocking the entire conditioning run about a first point in response to the contacting;
    moving the conditioning run in a substantially vertical direction, by the articles, independent of the rocking by moving the conditioning run about a second point, further from the conditioning run than the first point; and
    adjusting a rate of rotation of the conditioning run to adjust a spacing between the articles being conveyed.

8. The method of claim 7, wherein the conditioning run is part of a rotatable belt assembly.

9. The method of claim 7, wherein the conditioning run travels in a same direction as the articles being conveyed.

10. The method of claim 7, wherein the articles are conveyed using a bowl feeder.

11. An apparatus for conditioning articles, comprising:
    means for moving articles in a conveying direction along a path;
    means for contacting the moving articles with a conditioning run to condition the articles, a speed of rotation of the conditioning run being variable to adjust a spacing between the articles being conveyed;
    means for rocking the entire conditioning run about a first point in response to the contacting; and
    means for accommodating vertical movement of the conditioning run by moving the conditioning run about a second point, further from the conditioning run than the first points, due to contact with the articles, independent of the rocking of the conditioning run.

12. The apparatus of claim 11, wherein the conditioning run is part of a rotatable belt assembly.

13. An apparatus for conditioning articles, comprising:
    a bowl feeder with a bowl and a spiral track conveyer extending from a bottom to a top of the bowl feeder, the bowl feeder being vibrated to cause articles in the bowl to travel up the spiral track and exit along a stationary outlet path, a bottom surface of the articles contacting the outlet path, and the articles traveling along the spiral track conveyer contacting a radially outer wall of the bowl feeder to orient the articles; and
    a belt assembly above the outlet path and having a belt to contact an upper surface of the articles and having a conditioning run moving in a same direction as the articles being conveyed and extending in a conveying direction, wherein the belt assembly is rocked about a first point and moved vertically independent of the rocking by moving the conditioning run about a second point, further from the conditioning run than the first point due to contact with the articles, and a speed of rotation of the belt assembly is varied to adjust a spacing between the articles being conveyed.

14. An apparatus comprising:
    a conveyor moving articles in a conveying direction along a path; and
    a conditioning run extending in the conveying direction and contacting the articles being conveyed to condition the articles, a speed of rotation of the conditioning run being variable to adjust a spacing between the articles being conveyed, and the entire conditioning run rocking about a first point and moving vertically by moving the conditioning run about a second point, further from the conditioning run than the first points in response to the contacting, the rocking and vertical moving being independent of each other.

15. An apparatus as in claim 14, wherein the conditioning run contacts the articles being conveyed to change the shape of the articles, and thereby condition the articles.

16. An apparatus comprising:
a conveyor moving air tight bags in a conveying direction along a path; and
a conditioning run extending in the conveying direction and contacting the bags being conveyed to plump the bags, a speed of rotation of the conditioning run being variable to adjust a spacing between the bags being conveyed, and the entire conditioning run being rocked about a first point and moved vertically by moving the conditioning run about a second point, further from the conditioning run than the first point, independent of the rocking, in response to the contacting.

17. An apparatus comprising:
a conveyor moving air tight bags in a conveying direction along a path; and
means for contacting the bags as the bags are being conveyed to plump the bags, the means for contacting the bags having a variable speed to adjust a spacing between the bags being conveyed, the entire means for contacting rocking about a first point in response to the contacting, and being moved vertically independent of the rocking by moving the conditioning run about a second point, further from the conditioning run than the first points in response to the contacting.

18. An apparatus for conditioning articles, comprising:
a conveyor moving articles in a conveying direction along a path; and
a belt assembly adjacent to the path, the belt assembly having a belt with a conditioning run extending in the conveying direction and contacting the articles being conveyed to condition the articles, the entire belt assembly rocking about a first point, in response to the contacting and the belt being linearly and vertically displaceable by moving the conditioning run about a second point, further from the conditioning run than the first point independent of the rocking due to the contacting, to vary the spacing between the conditioning run and the path, a speed of rotation of the belt being variable to adjust a spacing between the articles being conveyed.

19. The apparatus of claim 18, wherein the conditioning run travels in a same direction as the articles being conveyed.

20. The apparatus of claim 18, wherein the conveyor is a bowl feeder.

21. The apparatus of claim 18, wherein the conveyor is a vibratory conveyor.

22. The apparatus of claim 18, wherein the belt extends over pulleys with the belt being displaceable and moving away from any articles that push against the belt.

23. The apparatus of claim 18, wherein the belt is coated with a resilient foam material.

24. The apparatus of claim 18, wherein the belt assembly is rotatable, and a speed of the conveyor, and a distance of the conditioning run above the path are variable.

25. An apparatus for conditioning articles, comprising:
a conveyor moving articles in a conveying direction along a path; and
a belt assembly adjacent to the path, the belt assembly contacting the articles being conveyed to condition the articles, the entire belt assembly rocking about a first point in response to the contact with the articles, the belt assembly further moving vertically by moving the belt assembly about a second point, further from the belt assembly than the first point independent of the rocking due to the contact with the articles.

* * * * *

UNITED STATES PATENT AND TRADEMARK OFFICE
CERTIFICATE OF CORRECTION

| | |
|---|---|
| PATENT NO. | : 7,401,451 B2 |
| APPLICATION NO. | : 10/187427 |
| DATED | : July 22, 2008 |
| INVENTOR(S) | : Robert Bennett |

Page 1 of 1

It is certified that error appears in the above-identified patent and that said Letters Patent is hereby corrected as shown below:

Column 4, Line 39, Claim 11 change "points," to --point,--.

Column 5, Line 6, Claim 14 change "points" to --point,--.

Column 5, Line 34, Claim 17 change "points" to --point,--.

Signed and Sealed this

Eighteenth Day of November, 2008

JON W. DUDAS
*Director of the United States Patent and Trademark Office*